United States Patent Office.

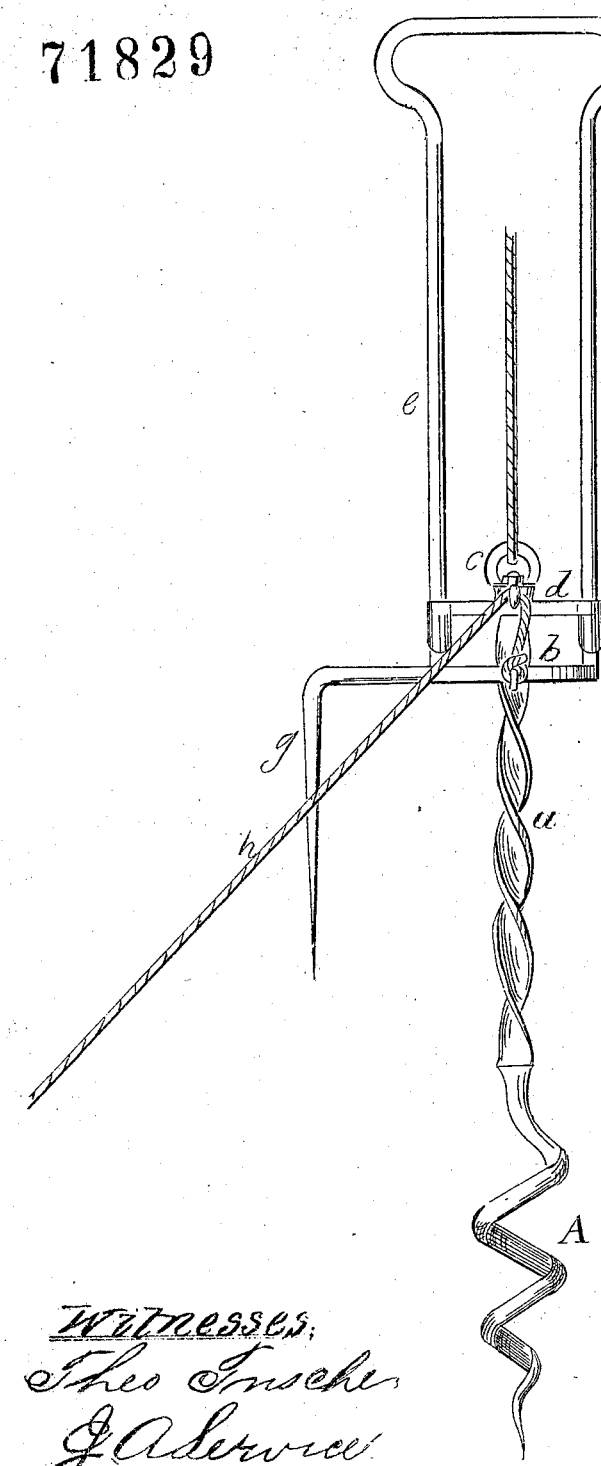

H. WILLARD, OF GRAND RAPIDS, MICHIGAN.

Letters Patent No. 71,829, dated December 3, 1867.

IMPROVEMENT IN HORSE HAY-FORKS.

The Schedule referred to in these Letters Patent and making part of the same.

TO ALL WHOM IT MAY CONCERN:

Be it known that I, H. WILLARD, of Grand Rapids, in the county of Kent, and State of Michigan, have invented a new and improved Horse Hay-Fork; and I do hereby declare that the following is a full, clear, and exact description thereof, which will enable those skilled in the art to make and use the same, reference being had to the accompanying drawings, forming part of this specification.

The drawing represents my improved horse hay-fork suspended by tackle for lifting hay.

This invention relates to an improvement in the construction of a horse hay-fork, and consists in connecting a worm-screw by a spiral shank with a drawing-handle, so arranged that the fork-screw shall enter the hay when operated on by horse-power, to hoist it up, and shall be released from the bundle of hay by a hand-rope, when the hay is to be discharged, as hereinafter more fully described.

A represents a metal worm-screw, on the end of a long spiral shank, $a$, that passes through a slot in the lower end $b$ of a double-sided handle, B, and has a swivel-ring, $c$, attached to the head $d$, for connecting with hoisting-tackle, as indicated in red by the drawing. The head $d$ is made to slide on the sides $e\ e$ of the handle B, so that the spiral shank $a$ shall turn the screw A in either direction, as it passes through the slot in the end $b$. On the bottom of the handle B is a straight prong or fork-tine, $g$, projecting parallel with the shank $a$, at such a distance therefrom and of such a length as may be required to gauge and regulate the size of the bundle of hay that is taken up by the fork.

The operation is very simple and effective. The fork is suspended in a barn or on a derrick, with tackle to be operated for hoisting the hay by horse-power in the usual way, and the point of the screw A being placed against the hay to be hoisted, while the handle B is pressed upon, the motion imparted to the screw by the spiral shank $a$, when it is drawn up into the handle, will cause the screw to penetrate the hay and fasten itself to a load regulated by the length and distance of the tine $g$, which also penetrates and holds the side of the bundle of hay while it is hoisted. In order to discharge the hay from the fork, a hand-rope, $h$, attached to the head of the shank $a$ is drawn upon to reverse the motion of the screw, and thus withdraw it from the bundle of hay.

Having thus described my invention, what I claim as new, and desire to secure by Letters Patent, is—

An improved horse hay-fork, having a worm-screw, A, on a spiral shank, $a$, in combination with a handle, B, arranged and operating substantially as herein described.

H. WILLARD.

Witnesses:
   T. FOOTE,
   E. SMITH, Jr.